United States Patent
Schroeder et al.

(10) Patent No.: US 9,283,985 B2
(45) Date of Patent: Mar. 15, 2016

(54) VEHICLE STEERING SYSTEM

(71) Applicant: Honda Motor Co., Ltd., Tokyo (JP)

(72) Inventors: Dustin Schroeder, Milford Center, OH (US); Maria Rae Rowland, North Lewisburg, OH (US); Masahiro Yamaguchi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 14/153,173

(22) Filed: Jan. 13, 2014

(65) Prior Publication Data

US 2015/0197273 A1    Jul. 16, 2015

(51) Int. Cl.
*B62D 3/12*    (2006.01)
*B62D 7/16*    (2006.01)

(52) U.S. Cl.
CPC ........ *B62D 3/12* (2013.01); *B62D 3/126* (2013.01); *B62D 7/16* (2013.01)

(58) Field of Classification Search
CPC ............ B62D 3/12; B62D 3/126; B62D 7/16; B62D 7/163; B62D 7/20; B62D 7/228; B62D 9/00; B62D 15/00; B62D 15/02
See application file for complete search history.

(56) References Cited

U.S. PATENT DOCUMENTS

| | | | |
|---|---|---|---|
| 2,219,645 A * | 10/1940 | Barthe et al. | 180/428 |
| 3,605,933 A | 9/1971 | Millard | |
| 3,951,045 A * | 4/1976 | Frei et al. | 91/467 |
| 3,958,462 A * | 5/1976 | Matschinsky et al. | 74/498 |
| 4,428,450 A * | 1/1984 | Stenstrom et al. | 180/428 |
| 4,819,499 A | 4/1989 | Morell | |
| 4,887,683 A | 12/1989 | Klosterhaus et al. | |
| 5,121,808 A * | 6/1992 | Visentini et al. | 180/435 |
| 5,613,572 A * | 3/1997 | Moedinger | 180/400 |
| 6,039,334 A | 3/2000 | Ozeki et al. | |
| 6,070,891 A | 6/2000 | Knautz et al. | |
| 6,457,375 B1 | 10/2002 | Buch | |
| 8,201,656 B2 | 6/2012 | Archer et al. | |
| 2005/0230177 A1* | 10/2005 | Wigdahl et al. | 180/434 |
| 2006/0043690 A1* | 3/2006 | Pankau | 280/93.502 |
| 2006/0231323 A1 | 10/2006 | Rosenfeld et al. | |
| 2007/0204715 A1 | 9/2007 | Pankau | |
| 2010/0289238 A1* | 11/2010 | Archer et al. | 280/93.514 |
| 2014/0291953 A1* | 10/2014 | Messenger et al. | 280/93.511 |
| 2014/0343791 A1* | 11/2014 | Suzuki | 701/41 |

* cited by examiner

*Primary Examiner* — Barry Gooden, Jr.
(74) *Attorney, Agent, or Firm* — Rankin, Hill & Clark LLP

(57) ABSTRACT

A vehicle steering system includes a gear rack and a pinion engaged to the gear rack. The gear rack is movable in a translational manner relative to a housing in response to a steering input command received by the pinion. A first bracket is connected to a first end portion of the gear rack and a second bracket is connected to a second end portion of the gear rack. Each of the first and second brackets extends inwardly toward the opposite end portion of the gear rack. First and second tie rods are connected to the respective first and second brackets. The pinion is located between respective end portions of the first and second tie rods. A travel limit element is attached to and offset from the rack housing. Movement of the gear rack is controlled by engagement of the first and second brackets with the travel limit element.

16 Claims, 6 Drawing Sheets

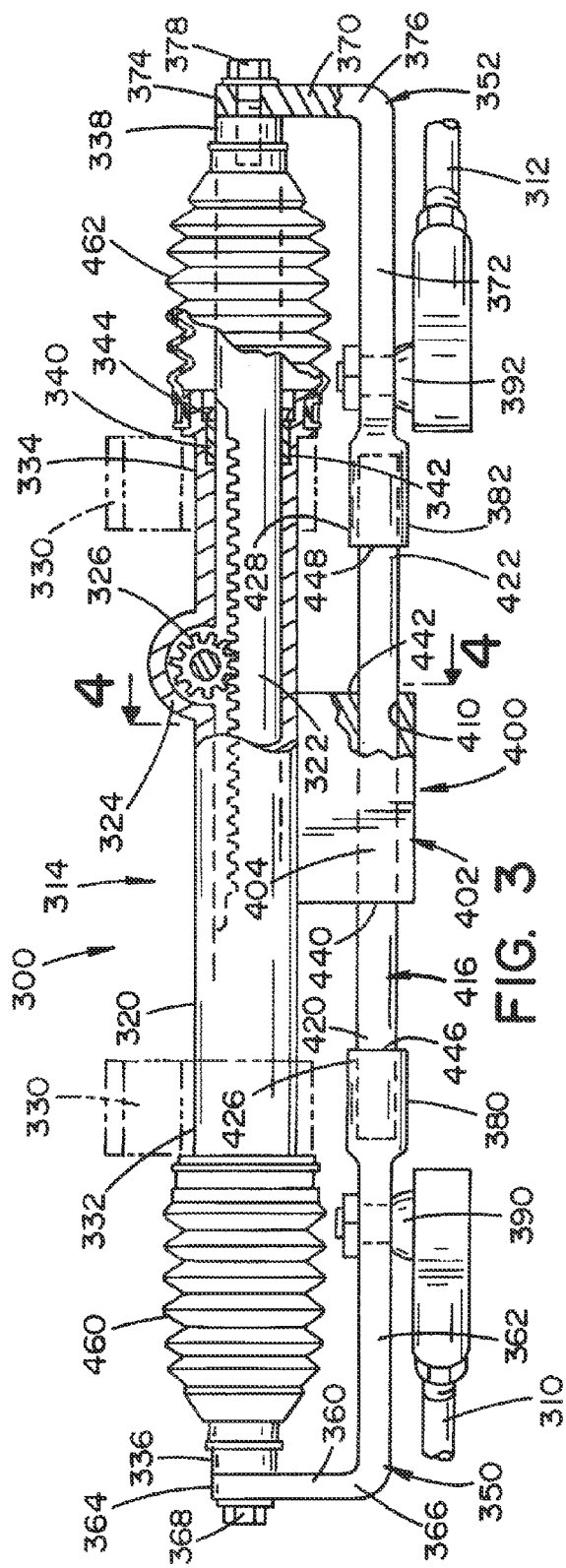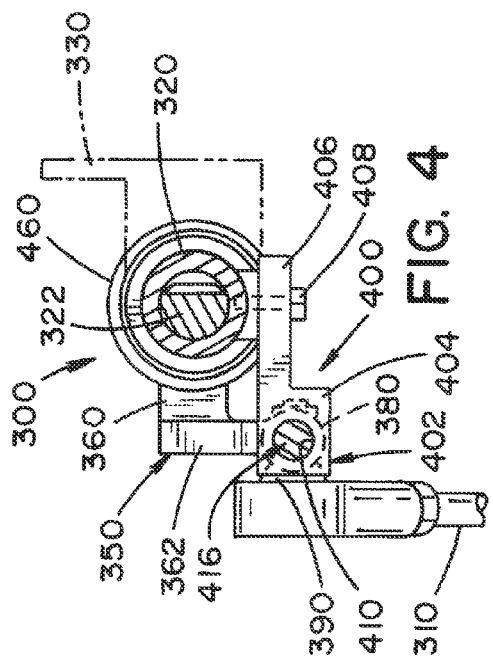

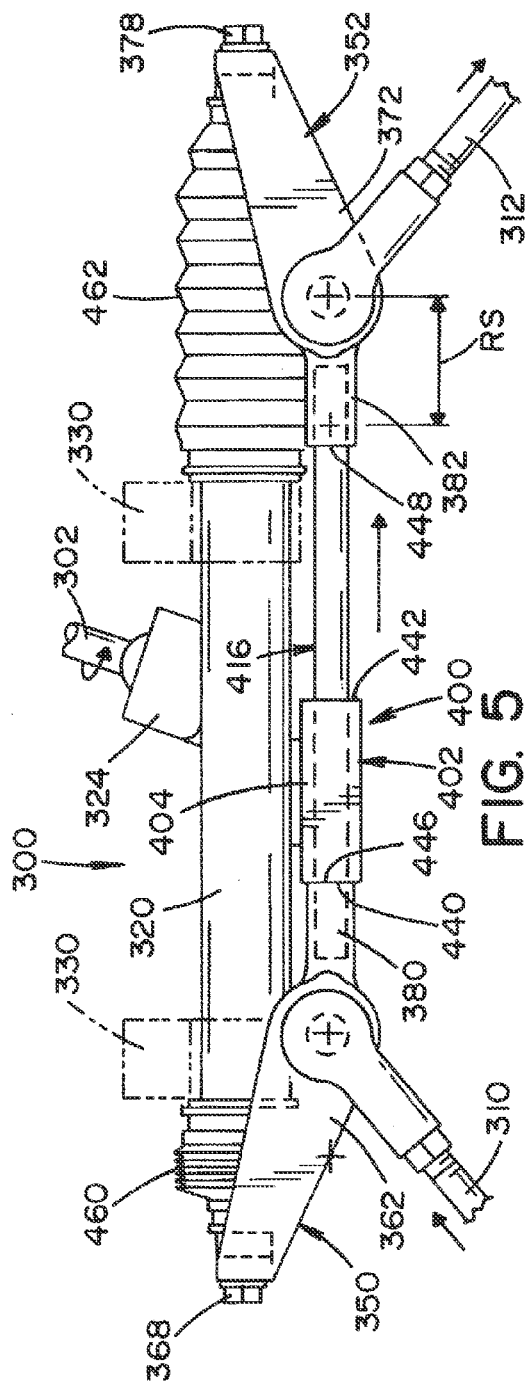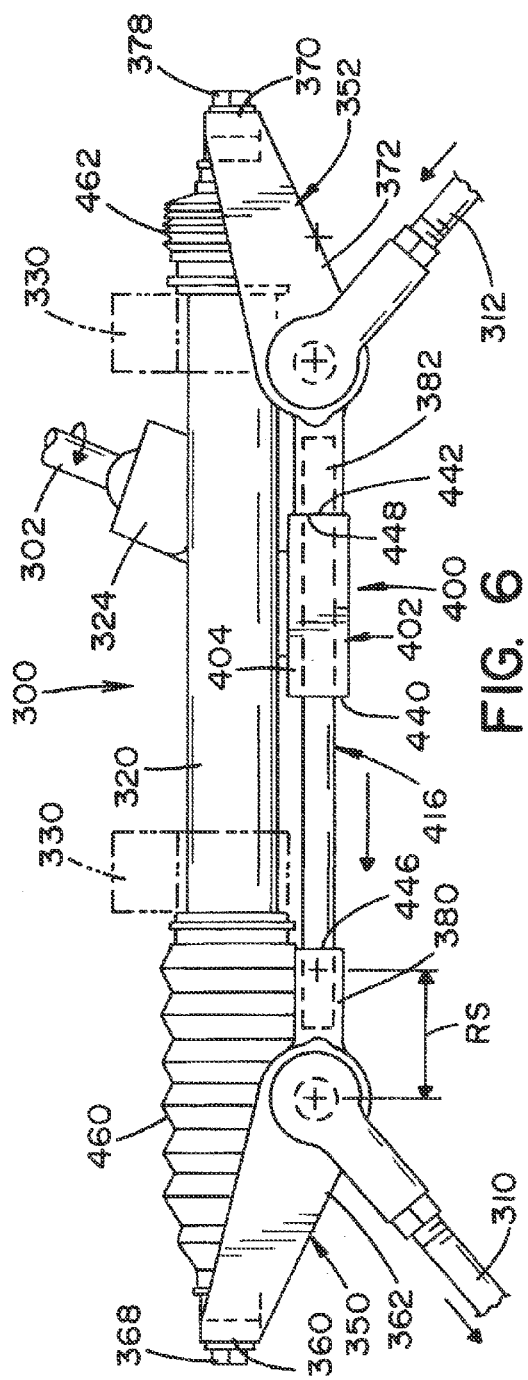

VEHICLE STEERING SYSTEM

BACKGROUND

A common type of vehicle steering system is a rack and pinion system in which an elongate rack having a linear gear is engaged by a geared pinion. The movable rack is mounted in a steering tube assembly that is mounted to the vehicle chassis. Rotation of the pinion causes the rack to move longitudinally within the steering tube relative to the pinion. In a vehicle, tie rods connect each of the front wheels to the movable rack and movement of the rack causes the front wheels to turn. A common type of rack-and-pinion steering system is a center-steer arrangement in which the tie rods are attached to the central section of the steering rack. The tie rod connections are located within boots. In a center-steer arrangement one end of the rack is retained by a bushing located in one end of the steering tube whilst the other end is engaged by the pinion, which is located toward the other end of the steering tube.

BRIEF DESCRIPTION

In accordance with one aspect, a vehicle steering system comprises a rack housing having a gear rack movably supported therein and a pinion housing attached to the rack housing and having a pinion connected to a steering shaft and engaged to the gear rack. The gear rack is movable in a translational manner relative to the rack housing in response to a steering input command received by the pinion. A first bracket is connected to a first end portion of the gear rack and a second bracket is connected to a second end portion of the gear rack, the first and second brackets being movable with the translational movement of the gear rack. Each of the first and second brackets extends inwardly toward the opposite end portion of the gear rack. A first tie rod has an end portion pivotally connected to the first bracket and a second tie rod has an end portion pivotally connected to the second bracket. Each tie rod is configured to steer a motive member in response to translational movement of the gear rack. The pinion housing together with the pinion is located between the respective end portions of the first and second tie rods. A travel limit element is fixedly attached to and offset from the rack housing. The translational movement of the gear rack is controlled by engagement of each of the first bracket and second bracket with the travel limit element.

In accordance with another aspect, a vehicle steering system comprises a rack housing having a gear rack movably supported therein and a pinion housing attached to the rack housing and having a pinion connected to a steering shaft and engaged to the gear rack. The gear rack is movable in a translational manner relative to the rack housing in response to a steering input command received by the pinion. A first bracket is connected to a first end portion of the gear rack and a second bracket is connected to a second end portion of the gear rack. Each of the first and second brackets is movable with the gear rack. A first tie rod has an end portion pivotally connected to the first bracket and a second tie rod has an end portion pivotally connected to the second bracket. Each tie rod is configured to steer a motive member in response to movement of the gear rack. A distance between the pivotal connections of the first and second tie rods is less than a distance between the first and second end portions of the gear rack. A travel limit element is centrally fixed to the rack housing. The translational movement of the gear rack is controlled by engagement of each of the first bracket and second bracket with the travel limit element. The vehicle steering system is a front steering system and the first and second tie rods are configured to be coupled to front motive members to steer the front motive members based upon actuation of the steering shaft.

In accordance with yet another aspect, a vehicle steering system comprises a rack housing having a gear rack movably supported therein and a pinion housing attached to the rack housing and having a pinion connected to a steering shaft and engaged to the gear rack. The gear rack is movable in a translational manner relative to the rack housing in response to a steering input command received by the pinion. A first flexible rubber boot is connected to both a first end portion of the gear rack extending outwardly of a first end of the rack housing and the rack housing first end. A second flexible rubber boot is connected to both a second end portion of the gear rack extending outwardly of a second end of the rack housing and the rack housing second end. A first bracket located outwardly of the first rubber boot is connected to the first end portion of the gear rack and a second bracket located outwardly of the second rubber boot is connected to the second end portion of the gear rack. Each of the first and second brackets is movable with the gear rack. A first tie rod has an end portion pivotally connected to the first bracket and a second tie rod has an end portion pivotally connected to the second bracket. The first and second tie rod connections are located outside the respective first and second flexible boots and are spaced inwards from the respective first and second end portions of the gear rack. Each tie rod is configured to steer a motive member in response to movement of the gear rack. A travel limit element is centrally attached to the rack housing. The travel limit element includes a sleeve slidably receiving an elongated shaft. A first end portion of the shaft is secured to the first bracket and a second end portion of the shaft is secured to the second bracket. The translational movement of the gear rack is controlled by engagement of each of the first bracket and second bracket with the sleeve. The stroke of the gear rack is confined between the pivotal connections of the first and second tie rods to the respective first and second brackets and is defined by a distance between each of the first and second brackets and the sleeve.

BRIEF DESCRIPTION OF THE DRAWINGS

FIG. 3 is a top view, partially broken away, of the exemplary vehicle steering system of FIG. 1.

FIG. 4 is a cross-sectional view taken along line 4-4 of the vehicle steering system of FIG. 3.

FIGS. 5 and 6 depict translational movement of the vehicle steering system of FIG. 2.

DETAILED DESCRIPTION

It should, of course, be understood that the description and drawings herein are merely illustrative and that various modifications and changes can be made in the structures disclosed without departing from the present disclosure. In general, the figures of the exemplary vehicle steering system are not to scale. It will also be appreciated that the various identified components of the exemplary vehicle steering system disclosed herein are merely terms of art that may vary from one manufacturer to another and should not be deemed to limit the present disclosure.

Figure 7:
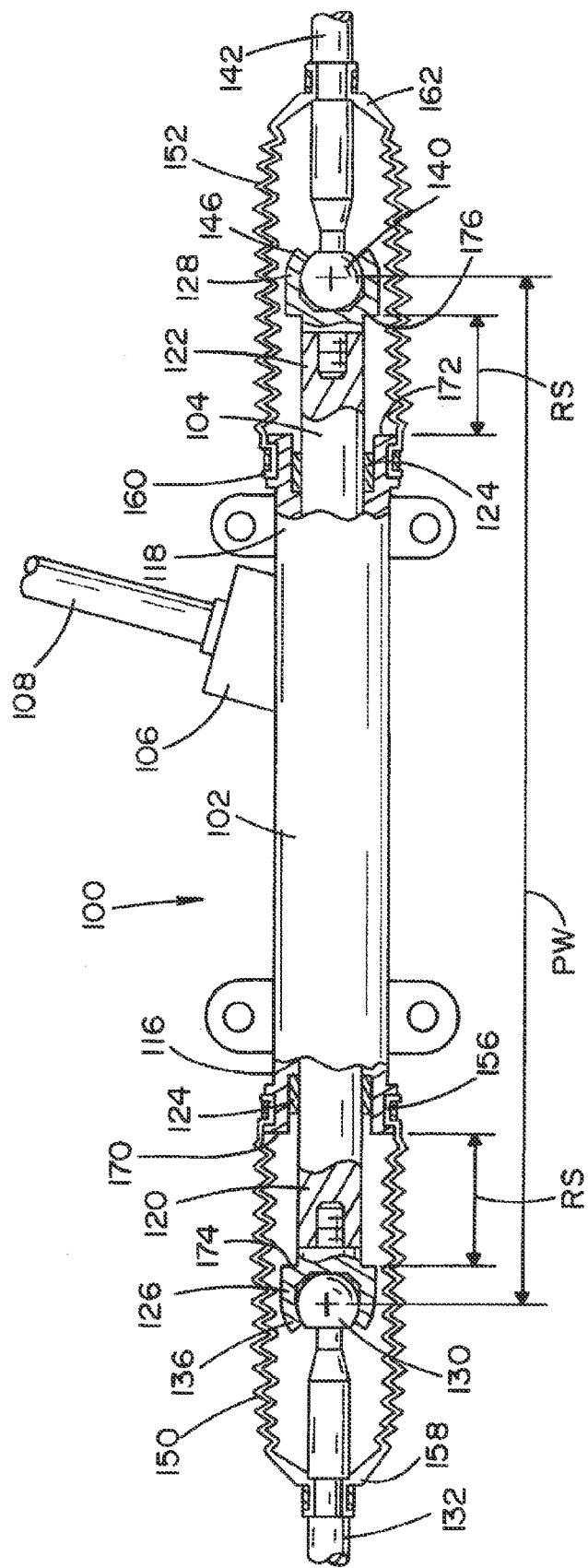
FIG. 7 is a front view of a known vehicle steering system.

Referring now to the drawings, wherein like numerals refer to like parts throughout the several views, FIG. 7 illustrates a known vehicle steering system 100 including a rack housing 102 having a gear rack 104 movably supported therein. A pinion housing 106 is attached to the rack housing 102 and has a pinion (not shown) connected to a steering shaft 108 and engaged to the gear rack 104. The gear rack is moveable is a translational manner relative to the rack housing 102 in response to a steering input command received by the pinion. The rack housing 102 has a first end 116 and an opposite second end 118, and the gear rack 104 has a length greater than a length of the rack housing 102 such that first and second end portions 120, 122 of the gear rack 104 extend outwardly from the respective first and second ends 116, 118 of the rack housing 102. Bushings 124 provided in the first and second ends 116, 118 of the rack housing 102 support the rack gear 104. A first socket connecting member 126 is fixed to the first end portion 120 of the gear rack 104 and a second socket connecting member 128 is fixed to the second end portion 122 of the gear rack.

A ball member 130 formed on one end of a first tie rod 132 is received in a correspondingly shaped receiving portion 136 of the first connecting member 126 to define a first pivot or pivotal connection. Similarly, ball member 140 formed on one end of a second tie rod 142 is received in a correspondingly shaped receiving portion 146 of the second connecting member 128 to define a second pivot or pivotal connection. First and second flexible rubber boots or covers 150, 152 are provided to reduce the amount dirt or other contaminants that is exposed to the rack housing 102 and more particularly to the gear rack 104. The first cover 150 includes a first end 156 that is coupled to the first end 116 of the rack housing 102 and a second end 158 coupled to the first tie rod 132 such that the connection between the gear rack 104 and first tie rod is housed in the first cover. The second cover 152 includes a first end 160 that is coupled to the second end 118 of the rack housing 102 and a second end 162 coupled to the second tie rod 142 such that the connection between the gear rack 104 and second tie rod is housed in the second cover. With the depicted configuration of the vehicle steering system 100, a distance between the pivotal connections of the first and second tie rods 132, 142 with gear rack 104 is approximately the same as a distance between the first and second end portions 120, 122 of the gear rack 104, thereby providing for a large pivot width PW. Further, a rack stroke RS of the gear rack 104 (i.e., a distance the pivot of each tie rod and gear rack can travel) is defined by a distance between end faces 170, 172 of the respective first and second ends 116, 118 of the rack housing 102 and internal end faces 174, 176 of the respective first and second connecting members 126, 128.

Figure 8:
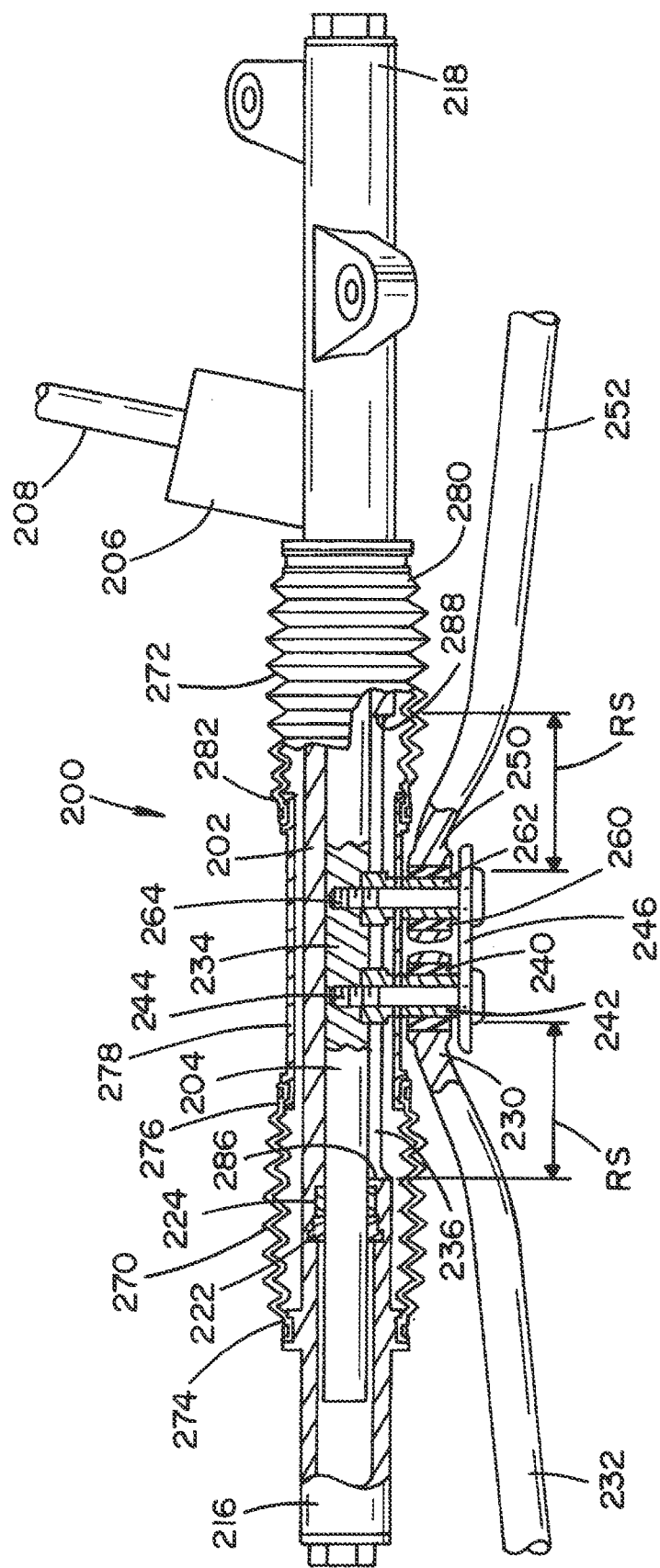
FIG. 8 is a front view of another known vehicle steering system.

In another known vehicle steering system 200, as shown in FIG. 8, a rack housing 202 having a gear rack 204 movably supported therein. A pinion housing 206 is attached to the rack housing 202 and has a pillion (not shown) connected to a steering shaft 208 and engaged to the gear rack 204. The gear rack is moveable in a translational manner relative to the rack housing 202 in response to a steering input command received by the pinion. The rack housing 202 has a closed first end 216 and an opposite closed second end 218, and the gear rack 204 has a length less than a length of the rack housing 202 such that the gear rack 204 is confined within the rack housing 202. A pair of bushings 222, 224 provided in the first end 216 of the rack housing 202 supports one end portion of the rack gear 204, and a pair of bushings (not shown) provided in the second end 218 of the rack housing 202 supports an opposite end portion (not shown) of the rack gear 204. An end portion 230 of a first tie rod 232 is pivotally connected to a central portion 234 of the gear rack 204 which is exposed via an axial slit 236 located on the rack housing 202. Specifically, end portion 230 is provided with a rubber bushing 240 thorough which a sleeve 242 is mounted. A fastener 244 extends through a support element or pivot holder 246 located beneath the rack housing 202, the sleeve 242 and threadingly engages the central portion 234 of the gear rack 204. Similarly, an end portion 250 of a second tie rod 252 is pivotally connected to the central portion 234 of the gear rack 204. Specifically, end portion 250 is provided with a rubber bushing 260 through which a sleeve 262 is mounted. A fastener 264 extends through the pivot holder 246, the sleeve 262 and threadingly engages the central portion 234 of the gear rack 204. First and second flexible rubber boots or covers 270, 272 are provided to reduce the amount dirt or other contaminants that is exposed to the rack housing 202 and more particularly to the gear rack 204. The first cover 270 includes a first end 274 that is coupled to the first end 216 of the rack housing 202 and a second end 276 coupled to a sleeve or cover 278 surrounding the rack housing 202. The second cover 272 includes a first end 280 that is coupled to the rack housing 202 at a location inside of the pinion housing 206.

With the depicted configuration of the vehicle steering system 200, because the first and second tie rods 232, 252 are directly connected to the gear rack 204, the end portions 230, 250 of the first and second tie rods 232, 252 must be placed as narrow as possible to leave clearance for gear teeth of the gear rack 204 and pinion (not shown). Further, with the location of the pinion housing 206 on one end of the rack housing 202, the engagement between the gear rack 204 and the pinion is one side of the gear rack 204. This increase a width of the vehicle steering system 200. And a rack stroke RS of the gear rack 204 (i.e., a distance the pivot of each tie rod and gear rack can travel) is defined by a distance between internal end faces 286, 288 of the rack housing 202 which define the ends of the slit 236 and outer surfaces of the respective sleeves 242, 262.

Figure 1:
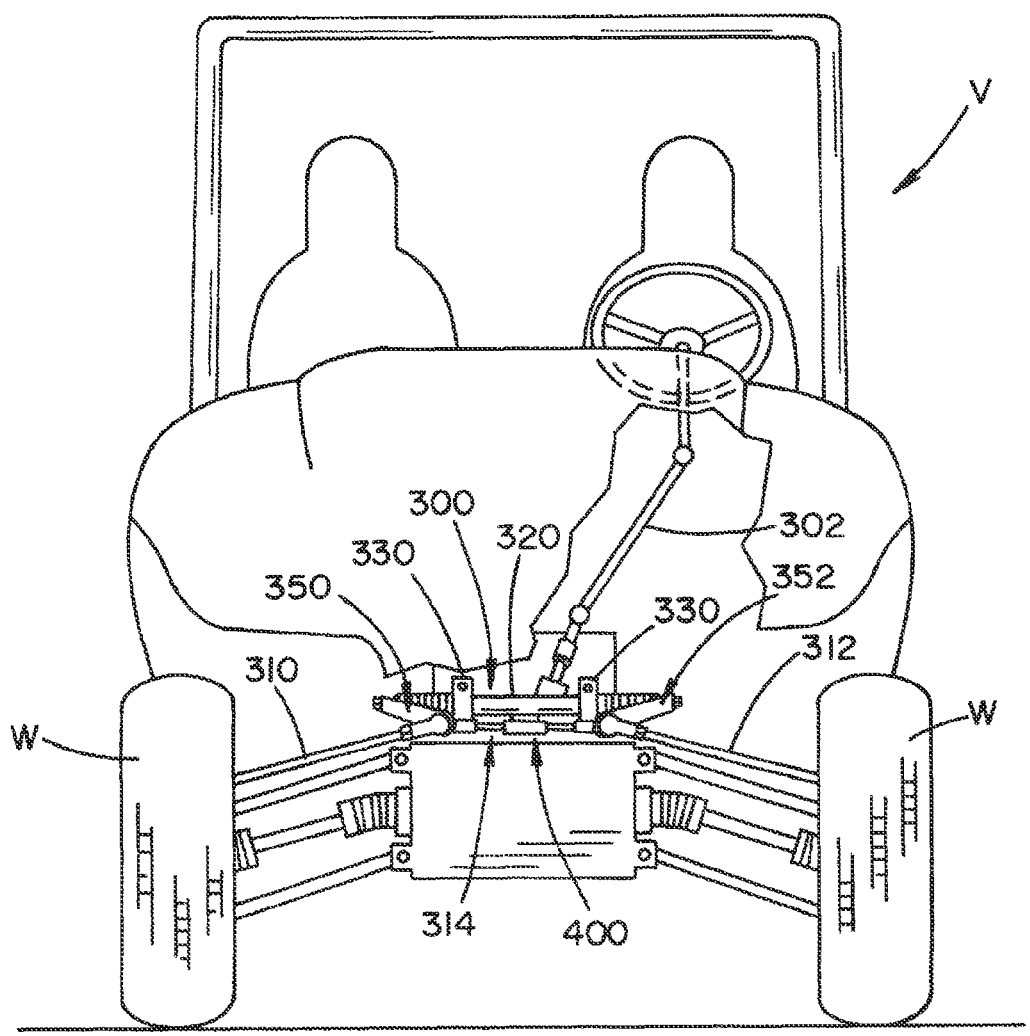
FIG. 1 is a schematic view of a vehicle including an exemplary vehicle steering system according to the present disclosure.
Figure 2:
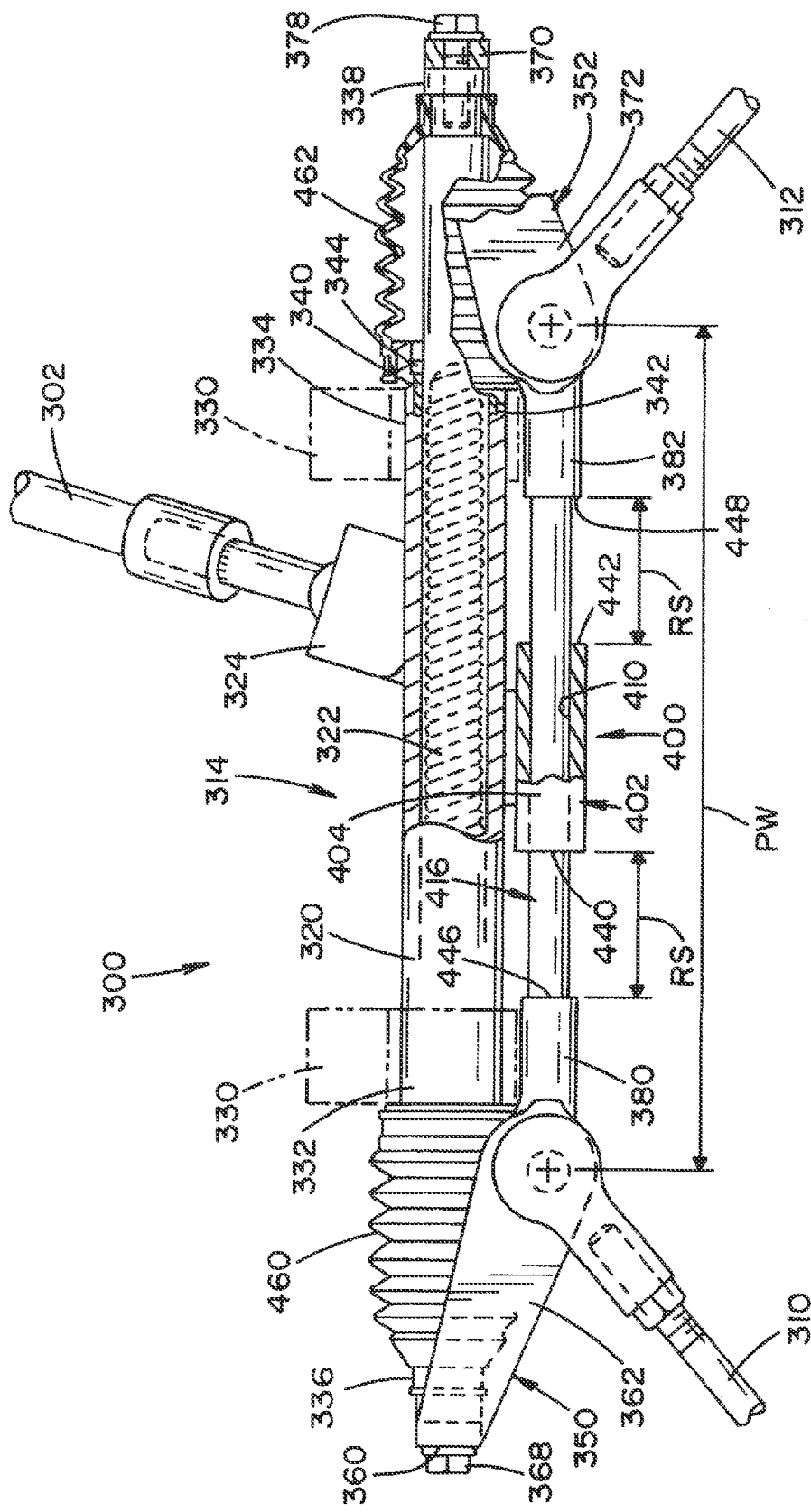
FIG. 2 is a front view, partially broken away, of the exemplary vehicle steering system of FIG. 1.

FIGS. 1-3 depict an exemplary vehicle steering system 300 according to the present disclosure. Similar to the vehicle steering systems 100, 200 of FIGS. 7 and 8, the exemplary vehicle steering system 300 is configured to transmit a steering command received from a steering input for steering one or more front and/or rear motive members of a vehicle V. In the depicted embodiment, the vehicle steering system 300 is a front steering system configured to be coupled to front motive members, such as the front wheels W, to steer the front motive members based upon actuation of a steering shaft or column 302. The vehicle steering system 300 is configured to remain substantially within the periphery (e.g., lateral boundary, etc.) of the framework (e.g., chassis, frame, body, etc.) of the vehicle V while it steers the front wheels W through their full range of movement (e.g., between an extreme right-hand turn and an extreme left-hand turn, etc.). To facilitate the transmission of a steering command to the front wheels of the vehicle, first and second tie rods 310, 312 are coupled between the a rack and pinion mechanism 314 and the front wheels W.

The vehicle steering system 300 comprises a rack housing 320 having a gear rack 322 movably supported therein and a pinion housing 324 attached to the rack housing and having a pinion 326 connected to the steering shaft 302 and engaged to the gear rack 322. According to one aspect, the pinion housing 324 together with the pinion 326 are located between the end portions of the first and second tie rods 310, 312 and offset from a center of the gear rack 322. Thus, engagement of the pinion 326 and gear rack 322 is offset from a center of the gear rack. As shown in FIG. 1, to secure the rack housing 320 to the vehicle V, such as a frame or chassis, one or more mounting devices 330 are provided on the rack housing. With the rack housing 320 secured, the gear rack 322 moves in a translational manner along rack housing 320 upon the rotation of pinion 326 and the meshing engagement of the pinion gear portion and the gear rack 322. The rack housing 320 is a rigid, generally cylindrical structure that extends between a first end 332 and an opposite second end 334. According to the embodiment illustrated in FIG. 4, the rack housing 320 has a cross-section that is generally circular in shape. According to various exemplary embodiments, the cross-sectional shape of the rack housing 320 may be any of a variety of shapes. Further, the cross-sectional shape and size of rack housing 320 is substantially continuous between the first end 332 and second end 334; although, this is not required.

As indicated previously, the rack housing 320 supports the gear rack 322 such that the gear rack 322 is movable in a translational manner relative to the rack housing 320 in response to a steering input command received by the pinion 326. The gear rack 322 has a length (greatest dimension) greater than a length (greatest dimension) of the rack housing 320 such that first and second end portions 336, 338 of the gear rack 322 extend outwardly from the respective first and second ends 332, 334 of the rack housing 320. Only one of the first end portion 336 and the second end portion 338 of the gear rack 322 is supported in the rack housing 320 by single bushing 340 positioned within the rack housing. In the illustrated embodiment, the bushing 340 can be press-fit into an enlarged portion 342 located at the second end 334 of the rack housing 320. To ensure that the bushing 340 remain fixed within the rack housing 320 as the gear rack 322 moves along the rack housing 320, a retaining member 344, such as a snap ring, is secured in the rack housing adjacent the bushing 340.

With continued reference to FIGS. 2 and 3, a first bracket 350 is connected to the first end portion 336 of the gear rack 322 and a second bracket 352 is connected to the second end portion 338 of the gear rack, the first and second brackets 350, 352 being movable with the translational movement of the gear rack 322. Each of the first and second brackets 350, 352 can be generally L-shaped and extends inwardly toward the opposite end portion of the gear rack 322. Further, according to one aspect, an end portion of each of the first bracket 350 and second bracket 352 is located outwardly from and substantially beneath the gear rack 322. However, it should be appreciated that the respective end portions of the first and second bracket 350, 352 can be located substantially above or in front of the gear rack 322. The first bracket end portion extends toward the second end portion 338 of the gear rack 322, and the second bracket end portion extends toward the first end portion 336 of the gear rack 322. Particularly, the first bracket 350 can include a first section 360 and a second section 362. The first section 360 of the first bracket 350 has a first end 364 mounted to the first end portion 336 of the gear rack 322 and a second end 366. The first end 364 can be attached to first end portion 336 of the gear rack 322 by any mechanical means known in the art, such as but not limited to the illustrated fastener 368. The second section 362 of the first bracket 350 extends outwardly and downwardly from the second end 366 toward the second bracket 352. Similarly, the second bracket 352 can include a first section 370 and a second section 372. The first section 370 of the second bracket 352 has a first end 374 mounted to the second end portion 338 of the gear rack 322 and a second end 376. The first end 374 can be attached to second end portion 338 of the gear rack 322 by any mechanical means known in the art, such as but not limited to the illustrated fastener 378. The second section 372 of the second bracket 352 extends outwardly and downwardly from the second end 376 toward the first bracket 350. As illustrated, according to one aspect, a distal end 380 of the second section 362 of the first bracket 350 is positioned inwardly of the first end 332 of the rack housing 320, and a distal end 382 of the second section 372 of the second bracket 352 is positioned inwardly of the second end 334 of the rack housing 320.

As indicated previously, each first and second tie rod 310, 312 is configured to steer a motive member, such as the front wheels W of the vehicle V, in response to translational movement of the gear rack 322. The first tie rod 310 has an end portion 390 connected to the first bracket 350 and the second tie rod 312 has an end portion 392 connected to the second bracket 352. Each of the end portions 390, 392 of the first and second tie rods 310, 312 can be configured as a ball joint, thereby providing a pivotal connection or pivot between each of the first and second tie rods 310, 312 and the respective first and second brackets 350, 352. Thus, the connection of each of the first and second tie rods 310, 312 is offset outwardly from the gear rack 322. As illustrated, the end portion 390 is located outwardly of the distal end 380 of the first bracket 350 such that pivotal connection of the first tie rod 310 to the first bracket 350 is aligned with the first end 332 of the rack housing 320 and the end portion 392 is located outwardly of the distal end 382 of the second bracket 352 such that the pivotal connection of the second tie rod 312 to the second bracket 352 is aligned with the second end 334 of the rack housing 322. Therefore, a distance between the pivotal connections of the first and second tie rods 310, 312 is less than a distance between the first and second end portions 336, 338 of the gear rack 322, thereby providing for a smaller pivot width PW. Further, the pinion housing 324 together with the pinion 326 is located between the respective end portions 390, 392 of the first and second tie rods 310, 312.

As best depicted in FIGS. 2-4, a travel limit element 400 is attached or fixedly attached to and offset outwardly from the rack housing 320 (i.e., spaced from an outer surface of the rack housing 320). As will be described in greater detail below, with the first and second brackets 350, 352 being movable with the gear rack 322, the translational movement of the gear rack 322 is controlled by engagement of each of the first bracket 350 and second bracket 352 with the travel limit element 400. According to one embodiment, the travel limit element 400 includes a sleeve 402 centrally located on the rack housing 320 and fixed with respect to the translational movement of the gear rack 322 (see FIGS. 5 and 6). The sleeve 402 includes main body 404 and a mounting flange 406 extending outwardly from the main body 404. The mounting flange 406 can be attached to the rack housing 320 by any mechanical means known in the art, such as but not limited to the illustrated fastener 408. Extending through the main body 404 is a channel or bore 410 dimensioned to slidably receive an elongated shaft 416. Seals (not shown) can be provided in the bore 410 of the sleeve to prevent intrusion of dirt or other contaminants. The shaft 416 is a rigid, generally cylindrical structure having a cross-section that is generally circular in shape. According to various exemplary embodiments, the cross-sectional shape of the shaft 416 may be any of a variety of shapes. Further, the cross-sectional shape and size of shaft is substantially continuous along its longitudinal extent; although, this is not required.

A first end portion 420 of the shaft 416 is secured to the first bracket 350 and a second end portion 422 of the shaft 416 secured to the second bracket 352. According to one aspect, the distal end 380 of the first bracket 350 includes a receiving portion 426 having an opening for fixedly receiving the shaft first end portion 420 and the distal end 382 of the second bracket 352 includes a receiving portion 428 having an opening for fixedly receiving the shaft first end portion 420. The first and second end portions 420, 422 can be press-fit into the respective openings of the receiving portions 426, 428; although, this not required. For example, the first and second end portions 420, 422 can be configured to be threaded into the respective openings of the receiving portions 426, 428. As depicted, once secured, the sleeve 402 and the shaft 416 are positioned substantially beneath the gear rack 322, and a longitudinal axis of the shaft 416 is spaced from and parallel to a longitudinal axis of the gear rack 322. Again, it should be appreciated that the travel limit element 400 can be positioned substantially above or in front of the gear rack 322. Further, because the first and second brackets 350, 352 are fastened to the respective first and second end portions 336, 338 of the gear rack 322, each of the first and second brackets 350, 352 and the shaft 416 connecting the first and second brackets move together with the translational movement of the gear rack 322.

The main body 404 of the sleeve 402 defines a first face 440 and a second face 442 opposite the first face. Further, the first bracket 350, particularly the receiving portion 426, has a first bracket face 446, and the second bracket 352, particularly the receiving portion 428, has a second bracket face 448. As illustrated, the first and second faces 440, 442 are in the area of the shaft 416 are planar and the first and second bracket faces 446, 448 are planar, which allow for proper engagement of the sleeve 402 to the first bracket 350 and second bracket 352.

The operation of the vehicle steering system 300 may best be understood by making reference to FIGS. 2, 3, 5 and 6. FIGS. 2 and 3 show the gear rack 322 in a stationary, intermediate position, such as when the vehicle V is headed straight ahead. In FIG. 5, counterclockwise rotational forces applied to the steering shaft 302 have rotated the pinion 326 moving the gear rack 322 to an extreme right-hand position. A first flexible rubber boot or cover 460 is nearly fully compressed and a second flexible rubber boot or cover 462 is approaching a fully expanded configuration. The gear rack 322 is moved in a first direction to a position wherein a majority of the gear rack 322 is almost entirely outside of the rack housing 320. The first bracket face 446 engages the first face 440 of the sleeve 402 to stop translational movement of the gear rack 322 in the first direction. In FIG. 6, clockwise rotational forces applied to the steering shaft 302 have rotated the pinion 326 moving the gear rack 322 to an extreme left-hand position. The first cover 460 is approaching a fully expanded configuration and the second cover 462 is nearly fully compressed. The gear rack 322 is moved in a second direction to a position wherein a majority of the gear rack 322 is almost entirely outside of the rack housing 320. The second bracket face 448 engages the second face 442 of the sleeve 402 to stop translational movement of the gear rack 322 in the second opposite direction.

Therefore, in contrast to the known vehicle steering systems 100, 200 of FIGS. 7 and 8, a rack stroke RS of the gear rack 322 (i.e., a distance the pivot of each tie rod and gear rack can travel) is confined between the pivotal connections of the first and second tie rods 310, 312 to the respective first and second brackets 350, 352 and is defined by a distance between the respective end faces 446, 448 each of the first and second brackets 350, 352 and the end faces 440, 442 of the sleeve 402. FIG. 5 shows the rack stroke RS as a distance the pivot of the second tie rod 312 travels during movement of the gear rack 322 in the first direction. FIG. 6 shows the rack stroke RS as a distance the pivot of the first tie rod 310 travels during movement of the gear rack 322 in the second direction.

The first and second covers 460, 462 are provided to reduce the amount dirt or other contaminants that is exposed to rack housing 320 and more particularly to gear rack 322. The covers 460, 462 have bellows that are expandable and contractible upon movement of gear rack 322 relative to rack housing 320. The first cover 460 is connected to both the first end portion 336 of the gear rack 320, which extends outwardly of the first end 332 of the rack housing 320, and the first end 332 of the rack housing 320. The second cover 462 is connected to both the second end portion 338 of the gear rack 322, which extends outwardly of the second end 334 of the rack housing 320, and the second end 334 of the rack housing 320. The connection of the first bracket 350 to the gear rack 322 is located outwardly of the connection of the first cover 460 to the first end portion 336, and the connection of the second bracket 352 to the gear rack 322 is located outwardly of connection of the second cover to the second end portion 338. Further, the first and second tie rod connections are located outside the respective first and second covers 460, 462 and are spaced inwards from the respective first and second end portions 336, 338 of the gear rack 322.

It should be appreciated that the vehicle steering system 300 can further include a device (not shown) for assisting in the steering action of the one or more motive members of the vehicle. According to an exemplary embodiment, such a device comprises one of a hydraulic assist that utilizes hydraulic fluid from a gerotor or rotary vane pump driven by the vehicle's engine to assist in the steering action or an electro-hydraulic assist (EHPS) which delivers hydraulic fluid to the vehicle steering system 300 via a pump driven by an electric motor. According to another exemplary embodiment, such a device comprises an electrical assist (EPS of EPAS) which uses sensors to detect the position and torque of the steering column 302, and a computer module applies assistive torque via an electric motor, which connects to the vehicle steering system 300. As is well known, this allows varying amounts of assistance to be applied depending on driving conditions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle steering system comprising:
   a rack housing having a gear rack movably supported therein;
   a pinion housing attached to the rack housing and having a pinion connected to a steering shaft and engaged to the gear rack, the gear rack movable in a translational manner relative to the rack housing in response to a steering input command received by the pinion;
   a first bracket connected to a first end portion of the gear rack and a second bracket connected to a second end portion of the gear rack, the first and second brackets being movable with the translational movement of the gear rack, each of the first and second brackets extending inwardly toward the opposite end portions of the gear rack;
   a first tie rod having an end portion pivotally connected to the first bracket and a second tie rod having an end portion pivotally connected to the second bracket, each of the first and second tie rods configured to steer a motive member in response to translational movement of the gear rack, the pinion housing together with the pinion being located between the respective end portions of the first and second tie rods; and a travel limit element attached to and offset in a vehicle length direction from the rack housing, the translational movement of the gear rack being controlled by engagement of each of the first bracket and the second bracket with the travel limit element, wherein the travel limit element is spaced from an outer surface of the rack housing, and includes a sleeve slidably receiving an elongated shaft, a first end portion of the shaft secured to the first bracket and a second end portion of the shaft secured to the second bracket, the pivotal connection of each of the first and second tie rods to the respective first and second brackets is forward in the vehicle length direction from a longitudinal axis of the shaft of the travel limit element.

2. The steering system of claim 1, wherein the shaft moves together with the translational movement of the gear rack.

3. The steering system of claim 1, wherein each of the first and second brackets moves together with the translational movement of the gear rack.

4. The steering system of claim 1, wherein the pinion housing together with the pinion is located between the respective end portions of the first and second tie rods and offset from a center of the gear rack.

5. The steering system of claim 1, wherein only one of the first end portion and the second end portion of the gear rack is supported in the rack housing by a single bushing positioned within the rack housing.

6. The steering system of claim 1, wherein the pivotal connection of the first tie rod to the first bracket is aligned with a first end of the rack housing and the pivotal connection of the second tie rod to the second bracket is aligned with a second end of the rack housing.

7. The steering system of claim 1, wherein the pivotal connection of each of the first and second tie rods is offset outwardly from the gear rack.

8. The steering system of claim 1, wherein the sleeve is centrally located on the rack housing.

9. The steering system of claim 8, wherein the sleeve defines a first face and a second face opposite the first face, the first bracket having a first bracket face and the second bracket having a second bracket face, the first bracket face engaging the first face of the sleeve to stop the translational movement of the gear rack in a first direction and the second bracket face engaging the second face of the sleeve to stop the translational movement of the gear rack in a second opposite direction.

10. The steering system of claim 1, wherein the longitudinal axis of the shaft is spaced from and parallel to a longitudinal axis of the gear rack.

11. The steering system of claim 10, wherein the sleeve and the shaft are supported substantially beneath the gear rack.

12. A vehicle steering system comprising:
a rack housing having a gear rack movably supported therein;
a pinion housing attached to the rack housing and having a pinion connected to a steering shaft and engaged to the gear rack, the gear rack movable in a translational manner relative to the rack housing in response to a steering input command received by the pinion;
a first bracket connected to a first end portion of the gear rack and a second bracket connected to a second end portion of the gear rack, each of the first and second brackets movable with the gear rack;
a first tie rod having an end portion directly pivotally connected to an outer surface of the first bracket and a second tie rod having an end portion directly pivotally connected to an outer surface of the second bracket; and
a travel limit element centrally fixed to the rack housing, a translational movement of the gear rack being controlled by engagement of each of the first bracket and the second bracket with the travel limit element,
wherein a distance between the pivotal connection of the first tie rod to the first bracket and the pivotal connection of the second tie rod to the second bracket is less than a distance between the first and second end portions of the gear rack,
wherein the vehicle steering system is a front steering system and the first and second tie rods are configured to be coupled to front motive members to steer the front motive members based upon actuation of the steering shaft.

13. The steering system of claim 12, wherein the pinion housing together with the pinion is located between the respective end portions of the first and second tie rods and offset from a center of the gear rack.

14. The steering system of claim 12, wherein an end portion of each of the first bracket and the second bracket is located outwardly from the gear rack, the first bracket end portion extending toward the second end portion of the gear rack, and the second bracket end portion extending toward the first end portion of the gear rack.

15. The steering system of claim 14, wherein the travel limit element includes a sleeve slidably receiving an elongated shaft, a first end portion of the shaft secured to the first bracket and a second end portion of the shaft secured to the second bracket, and
the sleeve defines a first face and a second face opposite the first face, the first bracket engaging the first face to stop the translational movement of the gear rack in a first direction and the second bracket engaging the second face to stop the translational movement of the gear rack in a second opposite direction.

16. The steering system of claim 15, wherein a stroke of the gear rack is confined between the pivotal connections of the first and second tie rods to the respective first and second brackets and is defined by a distance between each of the first and second brackets and the sleeve.

* * * * *